United States Patent
Zhang et al.

(10) Patent No.: US 11,133,704 B2
(45) Date of Patent: Sep. 28, 2021

(54) SYNCHRONOUS SOFT-START NETWORKING CONTROL STRATEGY FOR PARALLEL AUXILIARY CONVERTERS OF EMU

(71) Applicant: CRRC QINGDAO SIFANG ROLLING STOCK RESEARCH INSTITUTE CO., LTD., Qingdao (CN)

(72) Inventors: Bo Zhang, Qingdao (CN); Bo Li, Qingdao (CN); Meiyun Li, Qingdao (CN); Wendong Ji, Qingdao (CN); Qingwen Sun, Qingdao (CN); Junbo Zhao, Qingdao (CN); Zhenzong Zhu, Qingdao (CN); Yongjie Mao, Qingdao (CN); Shen Wang, Qingdao (CN); Yu Wang, Qingdao (CN)

(73) Assignee: CRRC QINGDAO SIFANG ROLLING STOCK RESEARCH INSTITUTE CO., LTD. (CN), Qingdao (CN)

( * ) Notice: Subject to any disclaimer, the term of this patent is extended or adjusted under 35 U.S.C. 154(b) by 0 days.

(21) Appl. No.: 17/152,353

(22) Filed: Jan. 19, 2021

(65) Prior Publication Data
US 2021/0143671 A1 May 13, 2021

Related U.S. Application Data
(63) Continuation of application No. PCT/CN2019/102520, filed on Aug. 26, 2019.

(30) Foreign Application Priority Data
Oct. 30, 2018 (CN) .......................... 201811276033.3

(51) Int. Cl.
*G05B 19/042* (2006.01)
*H02J 13/00* (2006.01)
*H02J 3/00* (2006.01)

(52) U.S. Cl.
CPC ...... *H02J 13/00002* (2020.01); *G05B 19/042* (2013.01); *H02J 3/001* (2020.01); *G05B 2219/2639* (2013.01)

(58) Field of Classification Search
CPC .. H02J 13/00002; H02J 3/001; G05B 19/042; G05B 2219/2639
See application file for complete search history.

(56) References Cited

U.S. PATENT DOCUMENTS
2017/0207717 A1 7/2017 Wu

FOREIGN PATENT DOCUMENTS
| CN | 102170169 A | 8/2011 |
| CN | 102891500 A | 1/2013 |
(Continued)

OTHER PUBLICATIONS

Cheng et al. "An Inverter Control Method for Islanding Operation" from "Power System Technology, vol. 42, No. 1, Jan. 2018" (Year: 2018).*

(Continued)

*Primary Examiner* — Yuhui R Pan
(74) *Attorney, Agent, or Firm* — J.C. Patents

(57) ABSTRACT

A synchronous soft-start networking control strategy for parallel auxiliary converters of EMU, that is, when a first auxiliary converter is connected to the bus, non-first auxiliary converters complete the networking during an amplitude soft-start process of the first auxiliary converter. Specific solution is: fast networking logic, bus fast-tracking logic and PQ droop networking control strategy. Wherein, the fast networking logic comprises recognizing the first (Continued)

auxiliary converter and the non-first auxiliary converter; the bus fast-tracking logic comprises tracking phase, frequency and amplitude; the PQ droop networking control strategy comprises introducing a correction coefficient K. The synchronous soft-start networking control strategy for the parallel auxiliary converters of EMU can realize quickly and reliably automatic networking in an emergency traction mode of EMU, and significantly shorten networking time in a network normal mode of EMU. Therefore, it can ensure that EMU can complete startup loading within a specified time under various working conditions, which provides strong guarantee for stable and reliable operation of EMU.

14 Claims, 6 Drawing Sheets

(56) References Cited

FOREIGN PATENT DOCUMENTS

| | | | |
|---|---|---|---|
| CN | 102983620 A | | 3/2013 |
| CN | 103457494 A | | 12/2013 |
| CN | 106100359 A | | 11/2016 |
| CN | 106787663 A | * | 5/2017 |
| CN | 106787663 A | | 5/2017 |
| CN | 108649608 A | | 10/2018 |
| CN | 109193795 A | | 1/2019 |
| RU | 111592 U1 | | 12/2011 |
| RU | 2565598 C1 | | 10/2015 |
| WO | WO2016008544 | | 1/2016 |

OTHER PUBLICATIONS

International Search Report of PTC/CN2019/102520.
Search Report of the priority application No. CN201811276033.3.
"An Inverter Control Method for Islanding Operation", Power System Technology, vol. 42, No. 1, Jan. 2018.
1st Office Action of priority CN application.
2nd Office Action of priority CN application.
3rd Office Action of priority CN application.
Search Report of parallel RU application.
Supplementary European Search Report of parallel application EP19841890.

* cited by examiner

SYNCHRONOUS SOFT-START NETWORKING CONTROL STRATEGY FOR PARALLEL AUXILIARY CONVERTERS OF EMU

CROSS-REFERENCE TO RELATED APPLICATIONS

This application is a continuation of PCT/CN2019/102520 filed on Aug. 26, 2019, which claims the priority benefit of Chinese patent application No. 201811276033.3 filed on Oct. 30, 2018. The entirety of the above-mentioned patent applications is hereby incorporated by reference herein and made a part of this specification.

TECHNICAL FIELD

The present application relates to the technical field of converters networking of EMU, and in particular to a synchronous soft-start networking control strategy for parallel auxiliary converters of EMU.

BACKGROUND OF THE PRESENT INVENTION

At present, the CRH1/CRH3 EMU used in batches in China and the newly developed Chinese standard EMU have adopted a redundancy strategy of parallel outputs of auxiliary converters. The requirement for the parallel outputs of the auxiliary converters of EMU is to complete parallel networking first and then load loads.

1) Network Normal Mode

The networking strategy is as follows: one auxiliary converter is guided and controlled by the network as a first auxiliary converter, the output contactor is closed, and the bus three-phase power is established, and then other auxiliary converters are guided by the network to be connected to the AC bus in turn.

That is, first, a first auxiliary converter is established, and then non-first auxiliary converters are connected in turn for networking.

2) Emergency Traction Mode

From the aspect of reliable operation of EMU, it has been proposed in the newly designed EMU that the EMU still need to run to a nearby station at a low speed limit in case of a network failure, which is the emergency traction mode. In the emergency traction mode, due to network failure, the auxiliary converters cannot be guided to complete the orderly networking. The auxiliary converters need to independently complete the automatic networking process without the network guidance.

In the normal mode, after rising a pantograph of the EMU, the voltage is isolated and stepped down by the traction transformer, and input to the four-quadrant rectifier unit of the traction converter to work so as to provide DC voltage to the auxiliary converters. If the auxiliary converters fail to complete the networking within a specified time, the traction converter will breakdown due to non-operation of cooling unit (no three-phase AC power) and over-temperature of a heat sink, the pantograph will be lowered to disconnect the main circuit breaker, and the EMU startup will fail. Therefore, the entire set of auxiliary converters needs to quickly complete the parallel networking within the prescribed limited time (generally 15 s after the raising the pantograph) to supply power to the entire train's three-phase loads.

During the emergency traction, there is no network guidance, and the entire train will complete the loading of loads within the preset time. At this time, the networking process of the auxiliary converters is equivalent to blind starting. In order to quickly complete the networking within the limited time, there will be a competition for the first auxiliary converter, that is, multiple auxiliary converters are connected to the bus together as the first auxiliary converter. In this case, due to large differences in the output voltage amplitude and phase of multiple auxiliary converters that are connected to the bus as the first auxiliary converter, the multiple auxiliary converters will be in a rectified state, resulting in overvoltage of the supporting capacitor or overcurrent of the output. When the multiple auxiliary converters report a failure and exit the network, since the entire train's loads have been loaded, the auxiliary converters left on the bus will also stop due to load overcurrent because of a small number of auxiliary converters left and limited capacity (it will take time for the faulty auxiliary converters to be connected to the network again), causing the EMU to fail to start.

In summary, normal operation of the EMU requires the auxiliary converters to ensure that:

1) in the normal mode, the parallel networking of outputs can be quickly completed;

2) in the emergency traction mode, the parallel networking can be quickly and automatically completed without network guidance.

SUMMARY OF THE PRESENT INVENTION

In view of the above analysis on a startup process of EMU, the present application proposes a synchronous soft-start networking control strategy for parallel auxiliary converters of EMU to shorten a networking time of the auxiliary converters when the network is normal, reliably complete automatic networking without network guidance, ensure that the auxiliary converters can quickly and reliably complete parallel networking within a limited time under various working conditions, and provide three-phase AC power for the entire train in a timely and reliable manner to ensure reliable startup and operation of EMU.

For this purpose, the following technical solutions is provided by the present application.

A synchronous soft-start networking control strategy for parallel auxiliary converters of EMU is provided, comprising:

fast networking logic: by the fast networking logic, determining whether an auxiliary converter is a first auxiliary converter that is connected to a network during soft-start; if yes, executing a network connection logic for the first auxiliary converter, and if not, executing a network connection logic for non-first auxiliary converters; and bus fast-tracking strategy: a non-first auxiliary converter quickly tracks amplitude, phase, and frequency of a bus voltage by the bus fast-tracking strategy to quickly complete the networking.

Preferably, the fast networking logic comprises following specific steps:

ss1: detecting whether the bus voltage exceeds a set voltage threshold of the first auxiliary converter before an auxiliary converter closes an output contactor; if not, recognizing the auxiliary converter as the first auxiliary converter and executing the network connection logic for the first auxiliary converter, that is, executing step ss2; if yes, recognizing the auxiliary converter as a non-first auxiliary converter and executing the network connection logic for non-first auxiliary converters, that is, executing step ss3;

ss2: sending a command to close the output contactor until a close feedback of the output contactor is detected; determining whether the bus voltage is greater than the voltage threshold before the close feedback of the output contactor is received; if yes, switching to a startup of network connection of the non-first auxiliary converter and turning to step ss3; and if not, completing a startup of network connection of the first auxiliary converter;

ss3: the non-first auxiliary converter tracks the bus voltage, determining whether deviations between an output voltage of the non-first auxiliary converter and the bus voltage in amplitude, frequency and phase are within set deviation ranges before the output contactor is closed, if yes, sending an output contactor close command to close the output contactor, and completing the startup of the network connection of the non-first auxiliary converter; and if not, executing step ss3 again.

Preferably, a method for setting the voltage threshold Ud of the first auxiliary converter is as follows:
according to:

$$U_{alpha}=2/3*(Ua-Ub/2-Uc/2)$$

$$U_{beta}=2/3*(\sqrt{3}/2*Ub-\sqrt{3}/2*Uc)$$

$$Ud=\sqrt{U^2_{alpha}+U^2_{beta}}$$

combining above formulas to solve the voltage threshold Ud of the first auxiliary converter, where Ud is obtained by subjecting real-time phase voltage values Ua, Ub, Uc obtained by sampling to equal amplitude 32 transformation to generate Ualpha and Ubeta and then calculating Ud, and Ud is calculated in a single switching cycle.

Preferably, the voltage threshold Ud of the first auxiliary converter for AC380V bus is 50V.

Preferably, the bus fast-tracking strategy comprises following specific steps:

s1: recognizing the first auxiliary converter and the non-first auxiliary converter according to the fast networking logic, if it is the first auxiliary converter, executing step s2, otherwise, executing step s3;

s2: closing an output contactor, performing a voltage closed-loop amplitude soft-start, and adjusting a voltage of the first auxiliary converter by a first set of PI parameters when the first auxiliary converter is connecting to the network; determining whether an output voltage is within a set specified range after the first auxiliary converter is connected to the network, and if yes, switching PID control strategy to adjust the voltage by a third set of PI parameters; and s3: the non-first auxiliary converter is quickly connected to the bus and quickly tracks the amplitude of the bus voltage, not performing amplitude soft-start, closed-loop controlling the PI parameters, and adjusting a voltage of the non-first auxiliary converter by a second set of PI parameters when the non-first auxiliary converter is connecting to the network; determining whether the amplitude, phase, and frequency of the bus voltage meet network connection requirements and whether an output voltage is within the set specified range, if yes, switching the PID control strategy to adjust the voltage by the third set of PI parameters after the non-first auxiliary converter is connected to the network.

Preferably, the bus fast-tracking strategy further comprises phase and frequency tracking, and using a software phase lock algorithm to quickly track the phase and frequency of the bus voltage.

Preferably, the synchronous soft-start networking control strategy further comprises a PQ droop networking control strategy: after auxiliary converters are connected to the network, parallel current sharing of the auxiliary converters during the soft-start process is quickly realized by the PQ droop networking control strategy.

Preferably, a method of the PQ droop networking control strategy is as follows:

introducing a correction coefficient K in droop coefficients, and calculating by following formula, i.e.:

$$K = (V/V^*)^2$$
$$\begin{cases} f = f_0 - k_p * P * K \\ V = V_0 - k_Q * Q * K \end{cases}$$

where V is a given target value of a current amplitude closed-loop control, V* is a real-time output detection voltage value of a current auxiliary converter; f is a target frequency of the system, $f_0$ and $V_0$ are input control variables of the system, and P and Q are output active and reactive power components, $k_p$ and $k_Q$ are droop control coefficients and their values are related to specific mathematical models.

Preferably, a value of the correction coefficient K for the PQ droop networking control strategy is related to an output voltage amplitude, and a minimum value of V* is 1; when the amplitude reaches bus voltage requirement, that is, when entering PI D, the value of K is set to 1.

Compared with the prior art, the present application has the following advantages and beneficial effects.

(1) According to the voltage threshold setting of the first auxiliary converter and the switch from the first auxiliary converter to the non-first auxiliary converter in the fast networking logic, the first and the non-first auxiliary converters can be quickly recognized to realize fast networking, and the switch from the first auxiliary converter to the non-first auxiliary converter can be realized in an extreme case where multiple auxiliary converters are recognized as the first auxiliary converter, to minimize impact on the parallel connection to the network and ensure reliable networking.

(2) By the bus fast-tracking tracking strategy, the fast tracking of the bus voltage amplitude before the non-first auxiliary converter is connected to the network can be realized, which can effectively ensure the fast connection of the non-first auxiliary converters to the network.

(3) By the PQ droop control strategy, a problem of weak current sharing effect of the traditional PQ droop control in the soft-start process is effectively solved. The correction coefficient K is introduced, which greatly enhances the PQ droop effect, quickly realizes parallel current sharing during the soft-start process, increases a current sharing control range for parallel droop, and reliably ensures the completion of fast networking in the soft-start process.

(4) In the normal mode (the network is normal) of EMU, it can ensure that the parallel connection of the auxiliary converters can be realized during the amplitude soft-start process, and the networking can be completed quickly. Compared with the general networking logic, the networking time can be at least shortened by 50%.

(5) In the emergency traction mode (the network is failed) of EMU, it can ensure that the auxiliary converters can reliably complete automatic networking without network guidance.

(6) In the emergency traction mode (the network is failed) of EMU, it can ensure that the auxiliary converters can be quickly networked, and the parallel networking can be completed during the amplitude soft-start process of the first auxiliary converter, which can significantly shorten the networking time.

(7) It can ensure that EMU can complete the startup loading within the specified time under various working conditions, which provides strong guarantee for stable and reliable operation of EMU.

DETAILED DESCRIPTION OF THE PRESENT INVENTION

Hereinafter, the present application will be described in detail by exemplary implementations. However, it should be understood that, without further description, the elements, structures, and features of one implementation can also be beneficially combined into other implementations.

Figure 1:
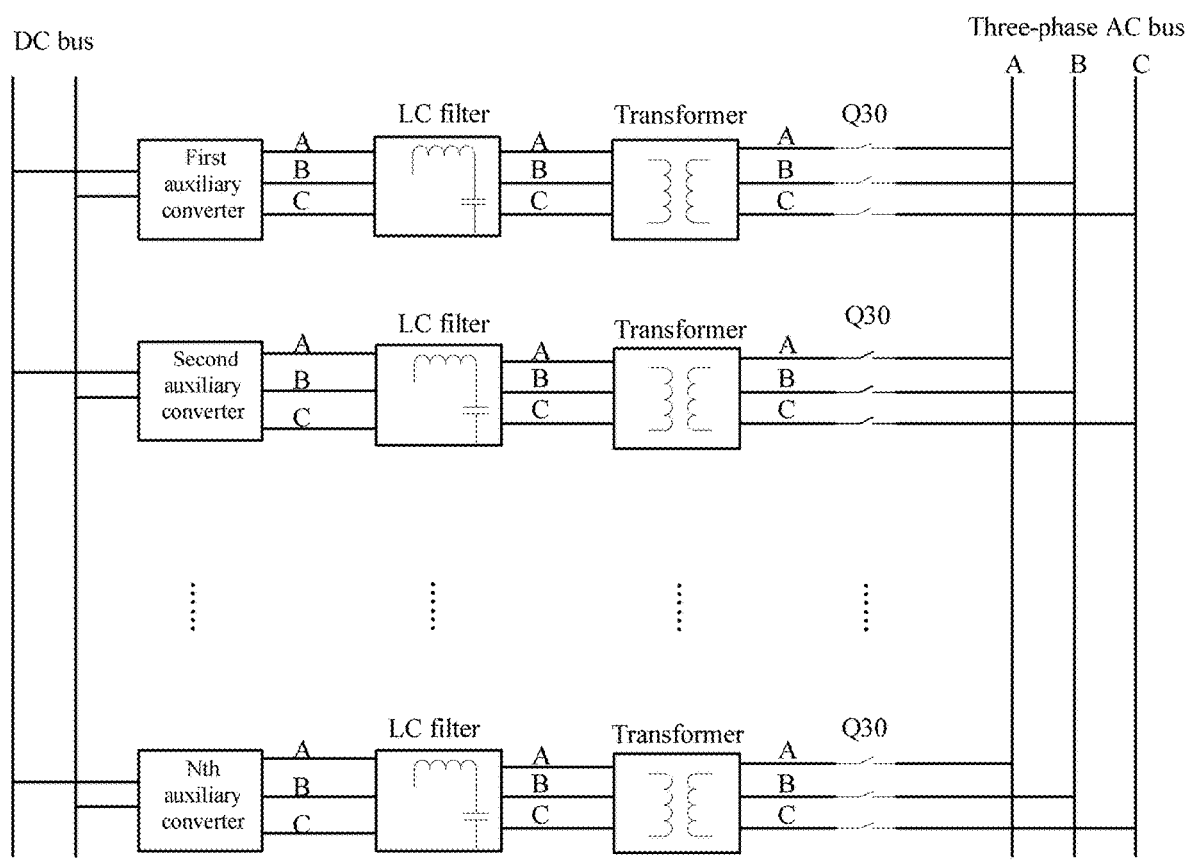
FIG. 1 is a topology diagram of parallel auxiliary converters of EMU according to the present application.
Figure 2:
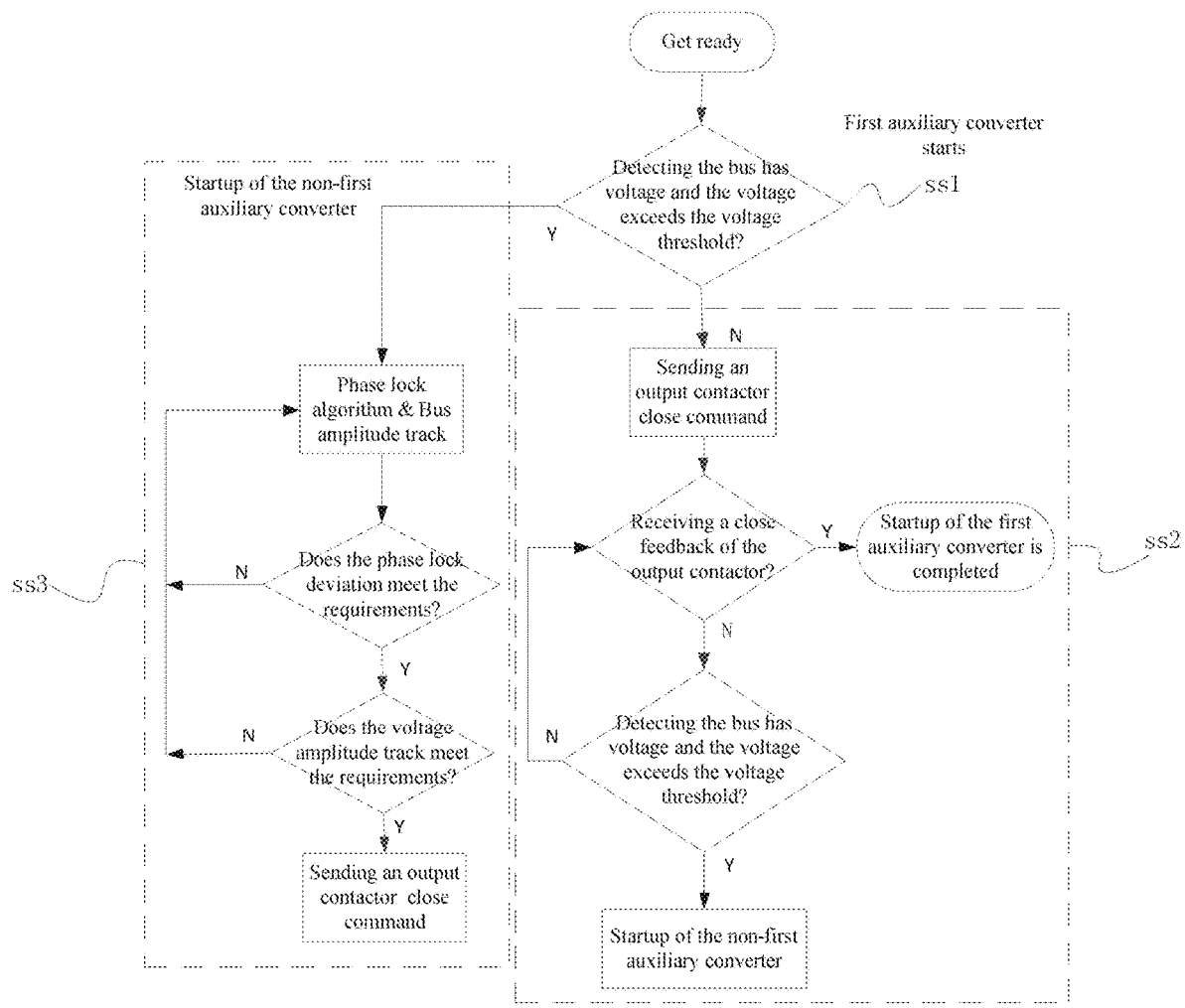
FIG. 2 is a logical block diagram of fast networking according to the present application.
Figure 3:
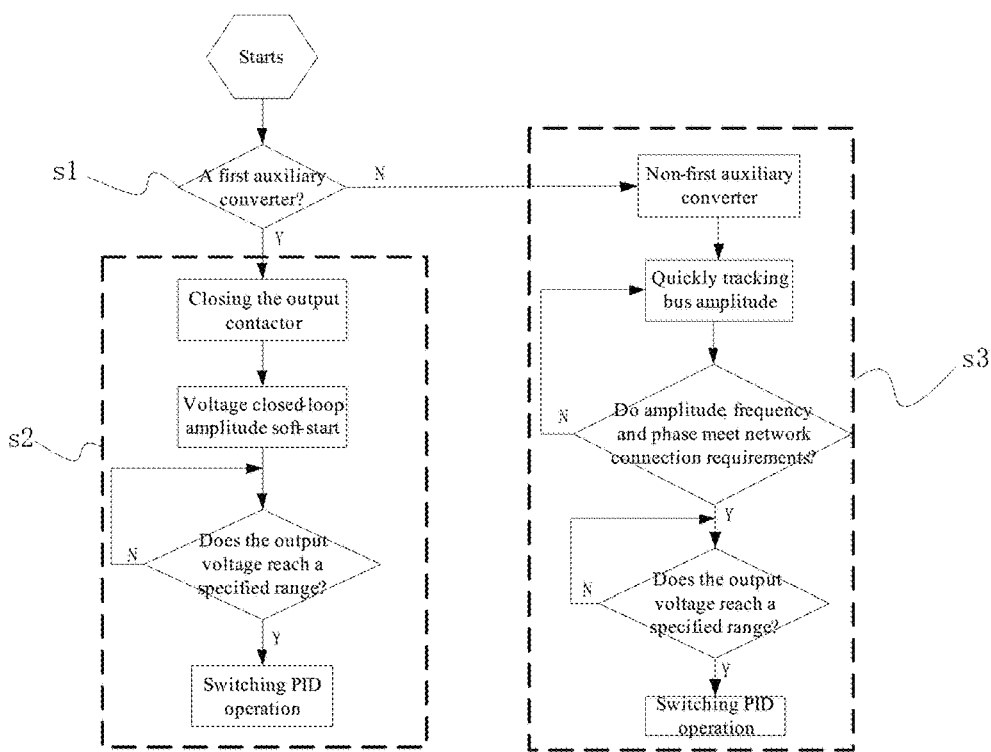
FIG. 3 is a logical block diagram of bus fast-tracking strategy according to the present application.

Referring to FIGS. 1, 2, and 3, the present application provides a synchronous soft-start networking control strategy for parallel auxiliary converters of EMU. That is, in a parallel system of auxiliary converters, when a first auxiliary converter is connected to a bus, other non-first auxiliary converters complete networking and are connected to the network during a soft-start process of the first auxiliary converter without waiting for the bus to establish a bus voltage. It comprises following steps.

(1) Fast networking logic: by which, during the soft-start, determining whether an auxiliary converter is a first auxiliary converter that is connected to a network; if yes, executing a network connection logic for the first auxiliary converter, and if not, executing a network connection logic for non-first auxiliary converters.

It specifically comprises following steps:

ss1: detecting whether the bus voltage exceeds a set voltage threshold of the first auxiliary converter before an auxiliary converter closes an output contactor; if not, recognizing the auxiliary converter as the first auxiliary converter and executing the network connection logic for the first auxiliary converter, that is, executing step ss2; if yes, recognizing the auxiliary converter as a non-first auxiliary converter and executing the network connection logic for the non-first auxiliary converters, that is, executing step ss3;

ss2: sending a command to close the output contactor until a close feedback of the output contactor is detected; determining whether the bus voltage is greater than the voltage threshold before the close feedback of the output contactor is received; if yes, switching to a startup of network connection of the non-first auxiliary converter and turning to step ss3; and if not, completing a startup of network connection of the first auxiliary converter;

ss3: the non-first auxiliary converter tracks the bus voltage, determining whether deviations between an output voltage of the non-first auxiliary converter and the bus voltage in amplitude, frequency and phase are within set deviation ranges before the output contactor is closed, if yes, sending an output contactor close command to close the output contactor, and completing the startup of network connection of the non-first auxiliary converter; and if not, executing step ss3 again.

In this embodiment, a method for setting the voltage threshold Ud of the first auxiliary converter is as follows:
according to:

$$U_{alpha}=\tfrac{2}{3}*(Ua-Ub/2-Uc/2)$$

$$U_{beta}=\tfrac{2}{3}*(\sqrt{3}/2*Ub-\sqrt{3}/2*Uc)$$

$$Ud=\sqrt{U^2_{alpha}+U^2_{beta}}$$

combining above formulas to solve the voltage threshold Ud of the first auxiliary converter, where Ud is obtained by subjecting real-time phase voltage values Ua, Ub, Uc obtained by sampling to equal amplitude 32 transformation to generate Ualpha and Ubeta and then calculating Ud, and Ud can be calculated in a single switching cycle.

The voltage threshold of the first auxiliary converter needs to be set reasonably. When the threshold is set too low and the bus has interference, the auxiliary converter will mistakenly recognize itself as the non-first auxiliary converter, which will cause an absence of the first auxiliary converter on the bus and thus the networking will be failed; when the threshold is set too high, multiple auxiliary converters will recognize themselves as the first auxiliary converters, that is, multiple auxiliary converters will be connected to the bus as the first auxiliary converter, which will be likely to cause the auxiliary converters is to fail and exit the network during the networking process. The setting of the voltage threshold of the first auxiliary converter needs to be adjusted and determined according to actual operating conditions. Generally, the threshold Ud is set to 50V for AC380V bus.

(2) Bus fast-tracking strategy: by which the non-first auxiliary converter can quickly tracks the amplitude, phase, and frequency of the bus voltage to quickly complete the networking. It specifically comprises following steps:

s1: recognizing the first auxiliary converter and the non-first auxiliary converter according to the fast networking logic, if it is the first auxiliary converter, executing step s2, otherwise, executing step s3;

s2: closing the output contactor, performing a voltage closed-loop amplitude soft-start, and adjusting a voltage of the first auxiliary converter by a first set of PI parameters when the first auxiliary converter is connecting to the network; determining whether an output voltage is within a set specified range after the first auxiliary converter is connected to the network, and if yes, switching PID control strategy to adjust the voltage by a third set of PI parameters; If not, keeping original PI parameters unchanged; and s3: the non-first auxiliary converter is quickly connected to the bus and quickly tracks the amplitude of the bus voltage, not performing amplitude soft-start, closed-loop controlling the PI parameters, and adjusting a voltage of the non-first auxiliary converter by a second set of PI parameters when the non-first auxiliary converter is connecting to the network; determining whether the amplitude, phase, and frequency of the bus voltage meet network connection requirements and whether the output voltage is within the set specified range after the non-first auxiliary converter is connected to the network, if yes, switching the PID control strategy to adjust the voltage by the third set of PI parameters; If not, keeping original PI parameters unchanged.

In the above bus fast-tracking strategy, it should be noted that the first set of PI parameters refers to PI parameters which have a slowest speed of voltage amplitude adjustment and are used in the soft-start process of the voltage amplitude; the second set of PI parameters refers to PI parameters which have a medium speed of voltage amplitude adjustment and are used for the non-first auxiliary converter to quickly track the bus voltage; the third set of PI parameters refers to PI parameters which have a fastest speed of voltage amplitude adjustment and are used for voltage closed-loop adjustment after the network runs. In addition, the speed of voltage amplitude adjustment of the above-mentioned three sets of PI parameters is relative. For the present application, as long as three relative adjustment speeds of slow, medium and fast can be achieved, those skilled in the art can determine specific values of the PI parameters according to the selected PI controller.

In this embodiment, three sets of PI control strategies are used. The first set of PI control parameter adjustment is used for voltage control when the first auxiliary converter is connecting to the network. At this time, the voltage of the auxiliary converter changes significantly, and the voltage of the auxiliary converter changes little after it is connected to the network. Therefore, it is necessary to switch the PID control to smoothly adjust the output voltage by the third set of PI parameters. The second set of PI parameters is used to adjust the voltage control when the non-first auxiliary converter is connecting to the network.

In this embodiment, using a software phase lock algorithm to quickly track the phase and frequency of the bus voltage.

After the auxiliary converters are connected to the network, the control needs to be further optimized. The present application provides improvements on the basis of the traditional PQ droop control strategy and proposes an improved PQ droop network control strategy.

(3) PQ droop networking control strategy: after the auxiliary converters are connected to the network, by PQ droop networking control strategy, parallel current sharing of the auxiliary converters during the soft-start process can be quickly realized. The specific method is as follows.

A correction coefficient K is introduced in droop coefficients of the traditional PQ droop control strategy. The traditional droop control strategy is:

$$\begin{cases} f = f_0 - k_p * P \\ V = V_0 - k_Q * Q \end{cases}$$

Figure 4:
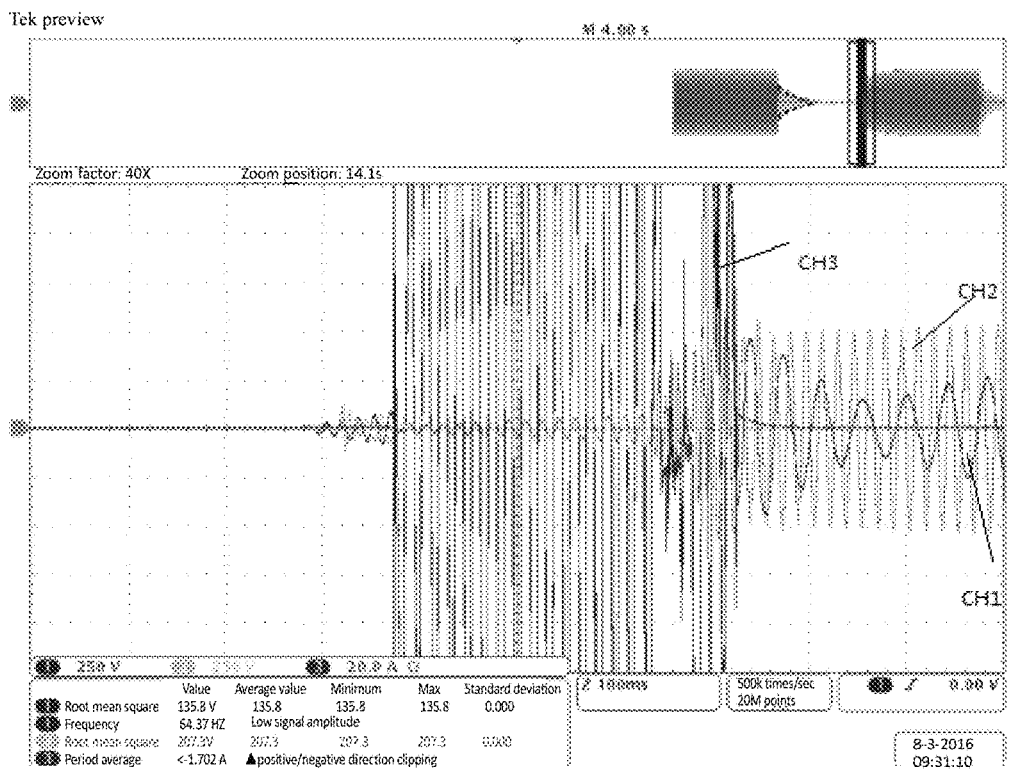
FIG. 4 is an output waveform diagram of a traditional PQ droop control strategy.

As shown in FIG. 4, CH1 represents a voltage at one output line of the first auxiliary converter, CH2 represents a voltage at the same output line of a non-first auxiliary converter, and CH3 represents an output current of the non-first auxiliary converter. According to the above-mentioned traditional droop control strategy, a U*I value at this time, i.e., a PQ droop amount, is very weak, and it is difficult to achieve the control on the parallel current sharing, which easily leads to poor control of the parallel current sharing. If one of the auxiliary converters is in a rectified state, and resulting in an output overcurrent or a voltage of the intermediate bus being too high, and finally causing the parallel connection failure. Therefore, the traditional PQ droop control strategy is generally not used in the soft-start parallel connection process.

A correction coefficient K is introduced, $$K = (V/V^*)^2$$
$$\begin{cases} f = f_0 - k_p * P * K \\ V = V_0 - k_Q * Q * K \end{cases}$$

The above formulas are combined to solve a target frequency f and a target voltage V of the system, where V is a given target value of a current amplitude closed-loop control, V* is a real-time output detection voltage value of a current auxiliary converter; f is a target frequency of the system, $f_0$ and $V_0$ are input control frequency and voltage variables of the system, respectively, and P and Q are output active and reactive power components, respectively, $k_p$ and $k_Q$ are droop control coefficients and their values are related to specific mathematical models.

Figure 5:
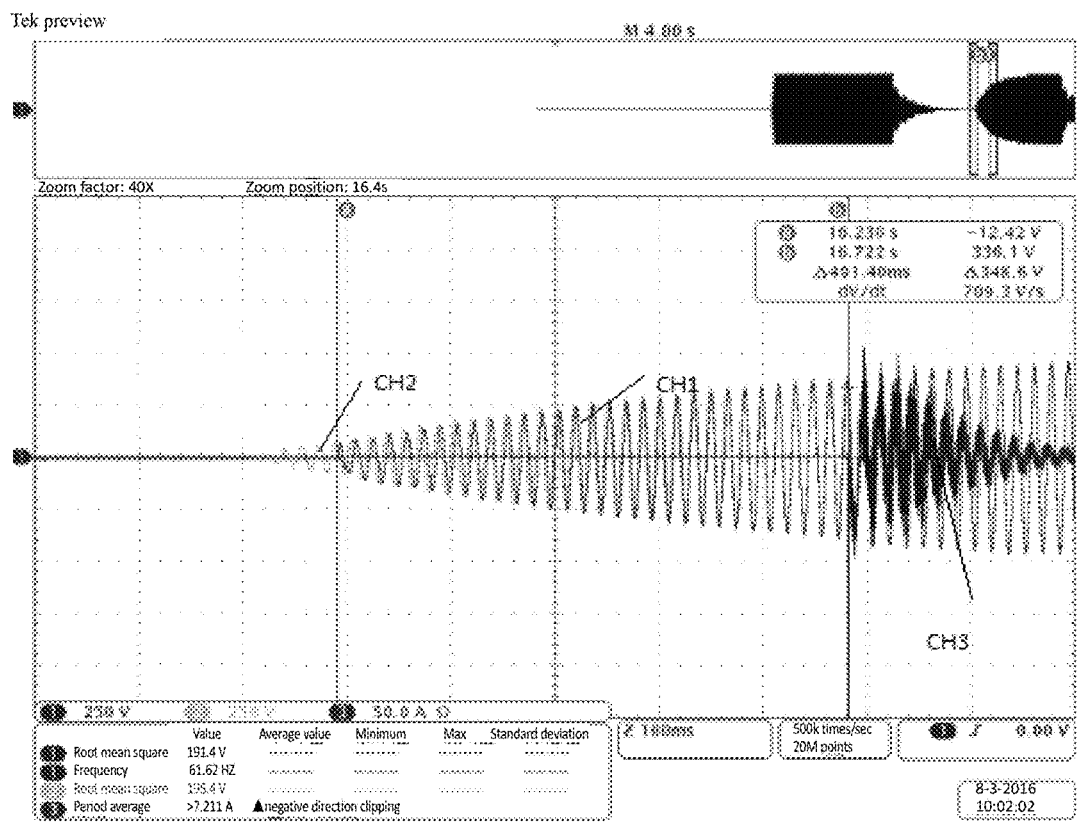
FIG. 5 is an output waveform diagram of a novel PQ droop control according to the present application.

As shown in FIG. 5, CH1 represents a voltage at one output line of the first auxiliary converter, CH2 represents a voltage at the same output line of a non-first auxiliary converter, and CH3 represents an output current of the non-first auxiliary converter. According to the PQ droop control strategy, the correction coefficient K (K>1) is introduced into the droop coefficients of the traditional PQ droop control strategy. K is a time-varying coefficient and is related to the output voltage amplitude. The smaller the amplitude is, the larger the K value is. For parallel connection in the amplitude soft-start process, although U and I are small, due to the introduction of the correction coefficient K, the PQ droop effect at this time is greatly enhanced, and parallel current sharing control can be quickly realized to ensure the normal completion of parallel networking in the amplitude soft-start process. As the voltage amplitude U increases, the correction coefficient decreases simultaneously. Considering deviation of the V*, a minimum value of V* is set to 1. When the amplitude reaches the bus voltage requirement range, it enters the PID, the effect of the correction coefficient is cancelled, and K is set to 1, to restore the traditional PQ droop control strategy.

In this embodiment, in an emergency traction mode, multiple auxiliary converters are recognized as the first auxiliary converter at the same time. When an auxiliary converter sends a command to close the output contactor, if voltage at the bus is detected before finishing the closing action, the first auxiliary converter is immediately switched to be a non-first auxiliary converter.

1) Network Normal Mode

Comparison Example

General parallel networking strategy: the first auxiliary converter outputs and establishes the bus voltage, and then the non-first auxiliary converters are phase-locked and connected to the bus grid in turn.

Figure 6:
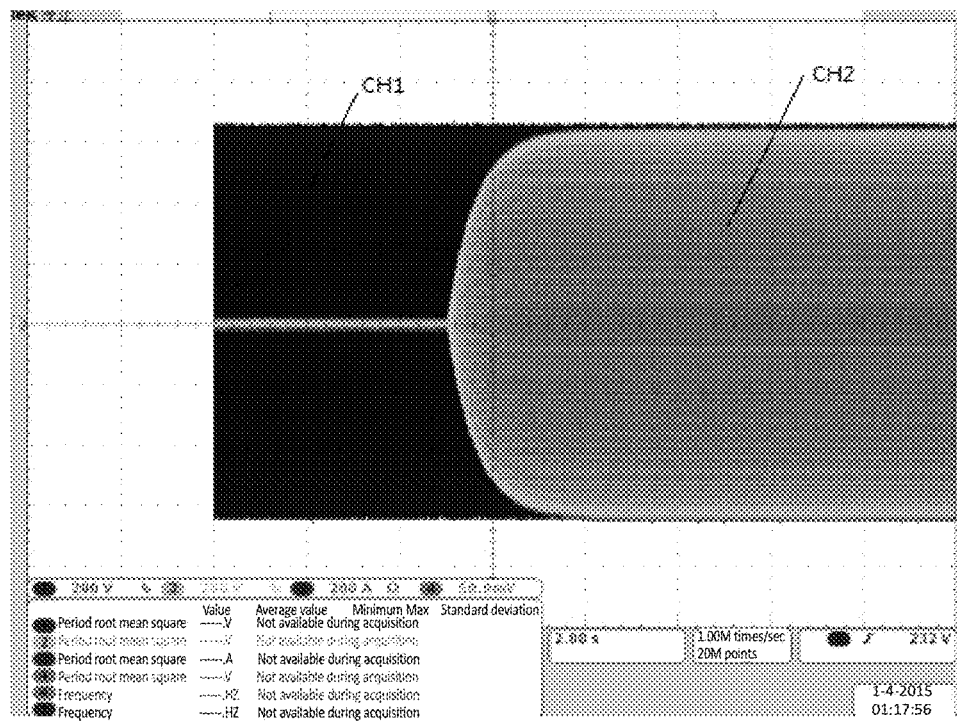
FIG. 6 is an output waveform diagram of a general networking strategy.

FIG. 6 shows a test waveform of the general networking strategy in the startup process. In this drawing, CH1 represents a voltage at one output line of the first auxiliary converter, and CH2 represents a voltage at the same output line of a non-first auxiliary converter. As shown:

1) The startup of the auxiliary converter is a bullet-type amplitude soft-start process, and the startup time is 2 s.

2) The connection of the non-first auxiliary converter must meet the connection conditions: the deviations of voltage amplitude, frequency and phase from the bus voltage are within the set deviation ranges. Generally, during the amplitude soft-start process of the connection of the non-first auxiliary converter, a phase lock process is executed synchronously, so that a minimum time for the non-first auxiliary converter to connect to the network is the amplitude soft-start time.

3) For extreme considerations, a time required by the general networking strategy is at least a sum of the time for the first auxiliary converter to establish a network and the time for the other non-first auxiliary converters to connect to the network, that is, at least 2+2=4 s. During the actual implementation, due to the network guidance by which the auxiliary converters are connected to the network in turn, networking will take more time.

Embodiment 1

The synchronous soft-start networking control strategy in this embodiment of the present application: when a first auxiliary converter is connected to the bus, non-first auxiliary converters complete the networking during an amplitude soft-start process of the first auxiliary converter.

(1) During the soft-start, the startup of the first auxiliary converter and the startup of the non-first auxiliary converter are recognized by the fast networking logic;

(2) by the bus fast-tracking strategy, the non-first auxiliary converter tracks amplitude, phase and frequency of the bus voltage; and (3) After the connection to the network, by the PQ droop control strategy, parallel current sharing during the soft-start process of the auxiliary converters is realized.

Figure 7:
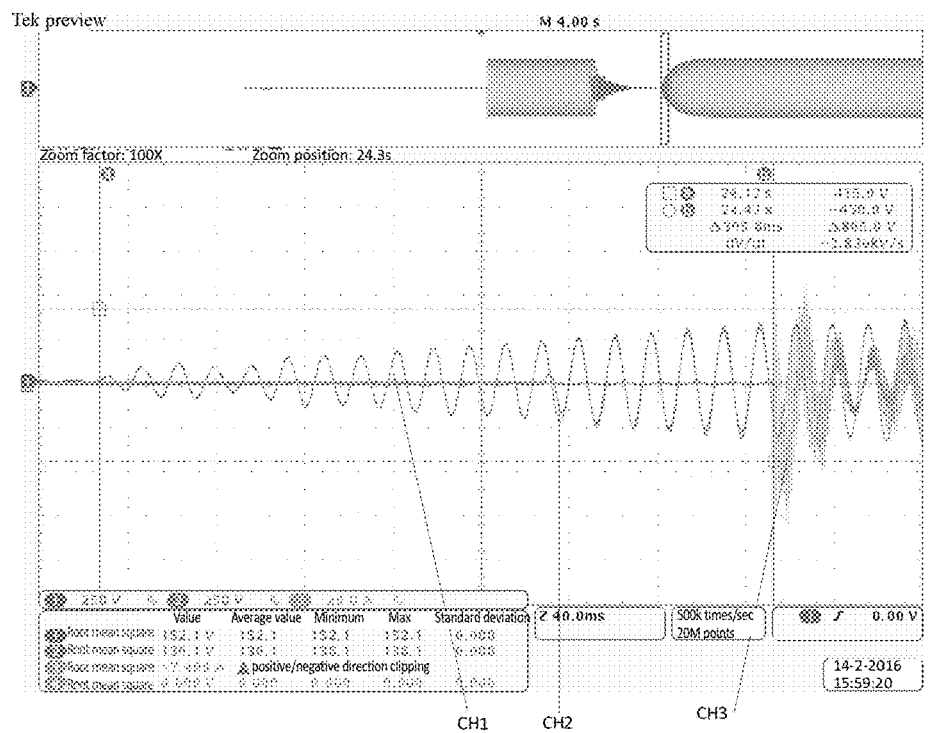
FIG. 7 is an output waveform diagram of a novel networking strategy in a network normal mode, according to the present application.

FIG. 7 shows a test waveform of the synchronous start networking control strategy in the startup process in this embodiment. In this drawing, CH1 represents a voltage at one output line of the first auxiliary converter, CH2 represents a voltage at the same output line of a non-first auxiliary converter, and CH3 represents a parallel output current of the non-first auxiliary converter. As shown:

1) CH3 indicates that there is parallel charging current at 305 ms, that is, the parallel connection to the network of the non-first auxiliary converter is completed when the first auxiliary converter starts about 305 ms, and the parallel networking process is completed during the amplitude soft-start process.

2) Therefore, for extreme considerations, the time required by the networking strategy in this embodiment is at least the time for the first auxiliary converter to establish the bus voltage, that is, 2 s, which saves time by 50% compared to the general networking strategy.

2) Emergency Traction Mode

Embodiment 2

Condition 1: In the emergency traction mode, the first auxiliary converter and the non-first auxiliary converter are connected in parallel in the soft-start process.

1) In the soft-start process, the non-first auxiliary converter executes the bus voltage tracking by the fast networking logic;

2) By the bus fast-tracking strategy, the fast tracking of the bus voltage amplitude, phase and frequency are completed; and (3) After the connection to the network, by the PQ droop control strategy, parallel current sharing during the soft-start process is realized.

Figure 8:
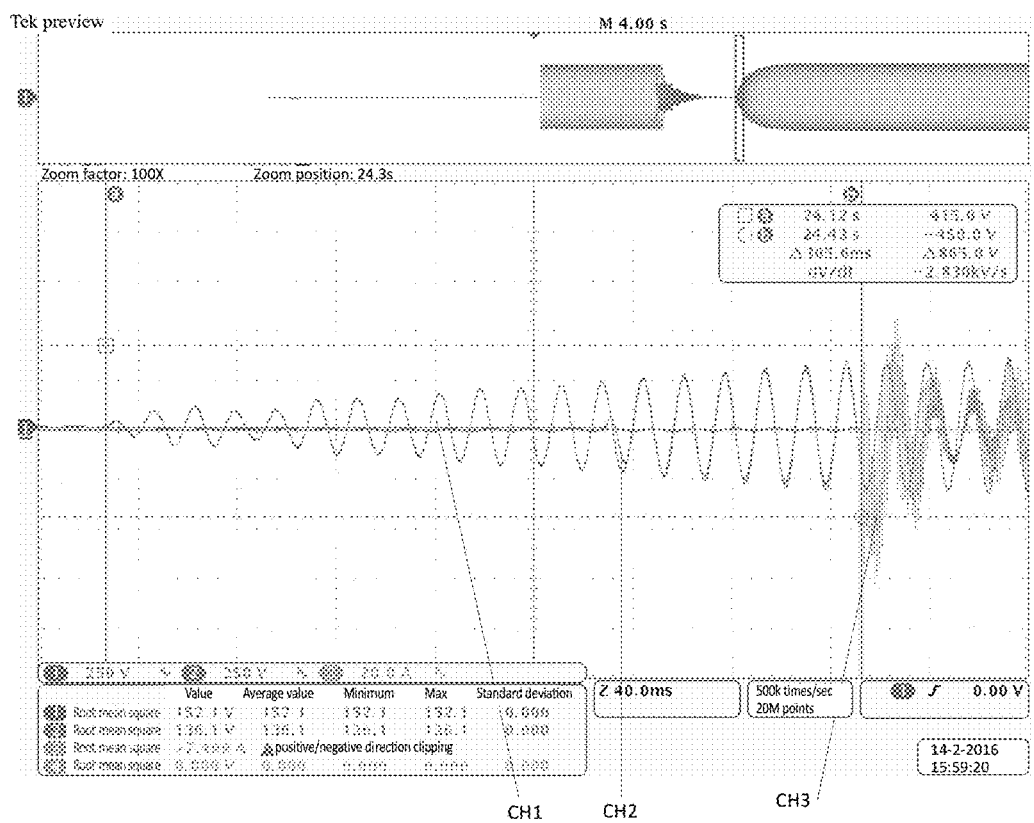
FIG. 8 is an output waveform diagram of Embodiment 2.

As shown in FIG. 8, CH1 represents a voltage at one output line of the first auxiliary converter, CH2 represents a voltage at the same output line of a non-first auxiliary converter, and CH3 represents a parallel output current of the non-first auxiliary converter. In Condition 1, the networking strategy in this embodiment can ensure that the networking is completed in the soft-start process. The time required by the networking in Condition 1 is the soft-start time of the first auxiliary converter, without requiring additional networking time.

Embodiment 3

Condition 2: In emergency traction mode, multiple auxiliary converters are recognized as the first auxiliary converter.

1) A relatively lagging auxiliary converter is quickly switched to be a non-first auxiliary converter, when the first auxiliary converter is closed to the bus, by the fast networking logic;

2) by the bus fast-tracking strategy, the non-first auxiliary converter approaches to the amplitude, frequency and phase of the bus voltage to the greatest extent before the mechanical delay of the contactor arrives; and (3) After the connection to the network, by the PQ droop networking control strategy, parallel current sharing during the soft-start process is realized.

Figure 9:
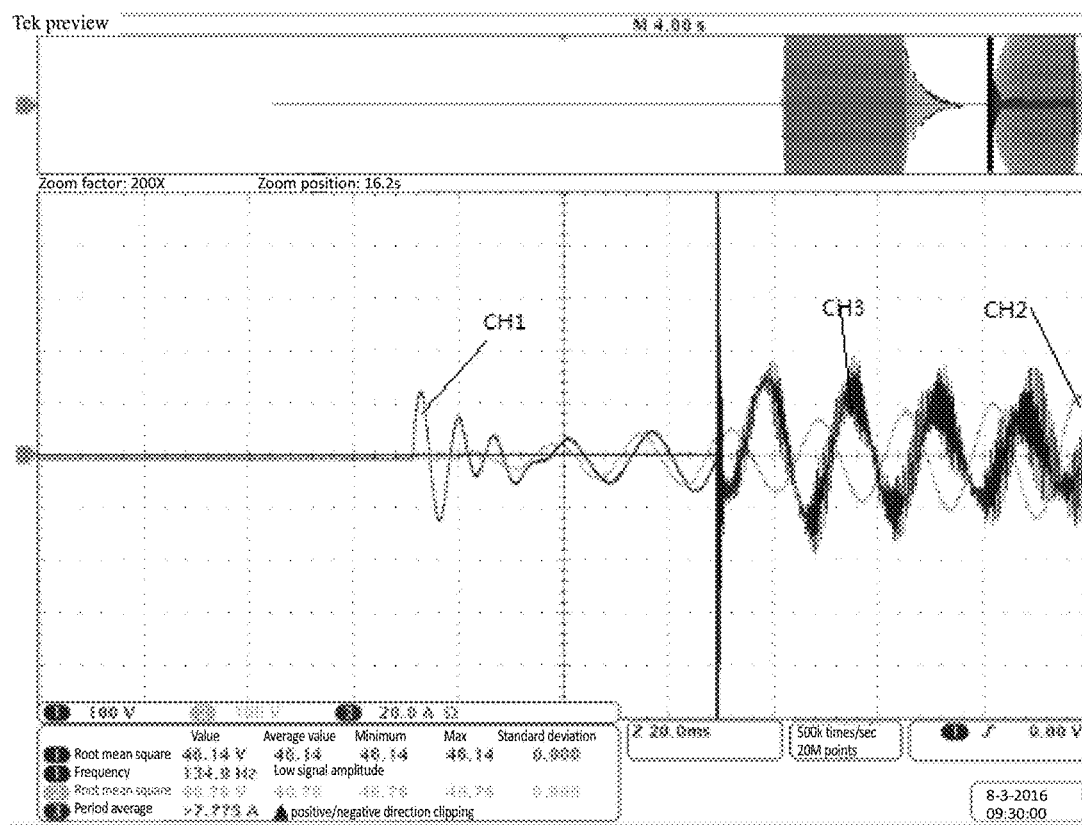
FIG. 9 is an output waveform diagram of Embodiment 3.

As shown in FIG. 9, CH1 represents a voltage at one output line of the first auxiliary converter, CH2 represents a voltage at the same output line of a non-first auxiliary converter, and CH3 represents an output current of the non-first auxiliary converter. When both auxiliary converters are recognized as the first auxiliary converter, due to a mechanical delay of about 40 ms in the action of the output contactor, if voltage at the bus is detected after the auxiliary converter sends a command to close the output contactor and before the closing action is completed, it is immediately switched to be a non-first auxiliary converter. In this case, instead of interrupting the action of the output contactor, the amplitude, phase, and frequency of the voltage are quickly adjusted in the remaining mechanical delay to track the bus, in order to reduce the differences in amplitude, phase and frequency from the bus voltage at the moment of connecting to the network, to reduce the current impact caused by the connection to the network, and to ensure the reliable completion of the connection to the network.

Figure 10:
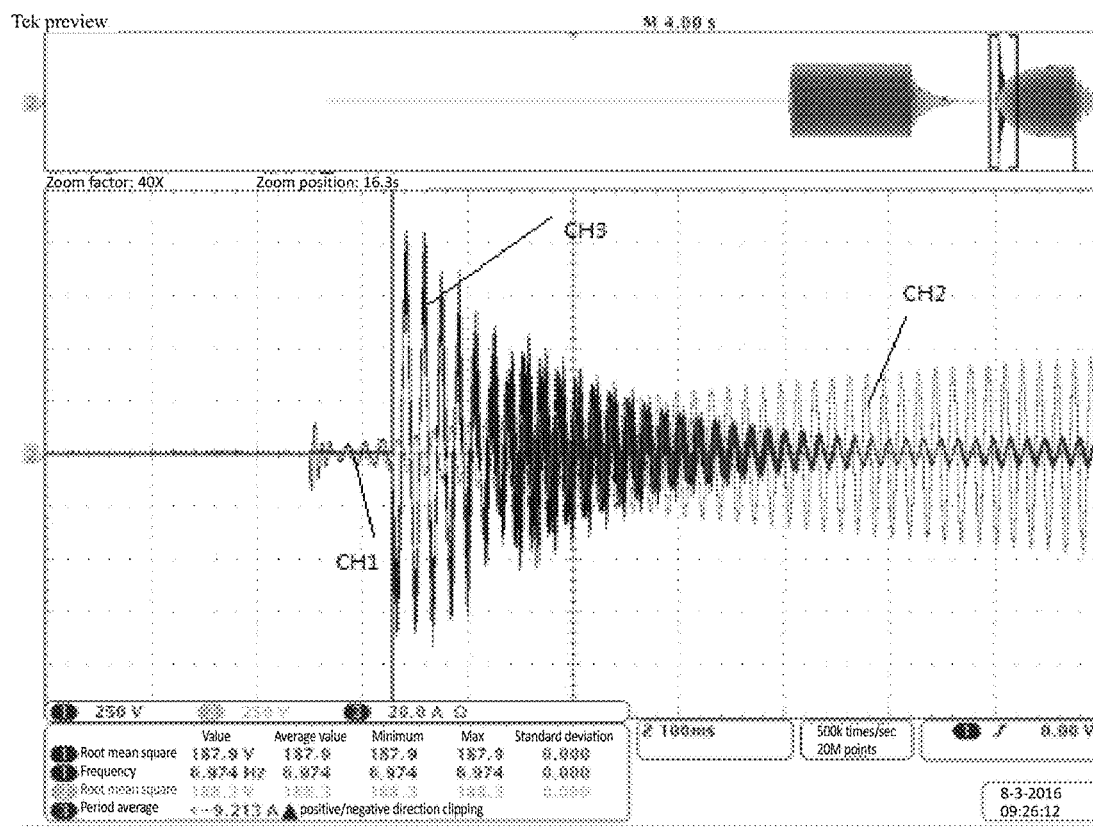
FIG. 10 is an output waveform diagram under extreme conditions of Embodiment 3.

In an extreme condition, as shown in FIG. 10, CH1 represents a voltage at one output line of the first auxiliary converter, CH2 represents a voltage at the same output line of a non-first auxiliary converter, and CH3 represents an output current of the non-first auxiliary converter. The startup time difference between the first auxiliary converter and the non-first auxiliary converter is close to 0 s. In this case, because of the reasonable setting of the voltage threshold of the first auxiliary converter and due to a mechanical delay of about 40 ms in the action of the output contactor, the voltage amplitude of the auxiliary converter will not be too high when connecting to the network. Finally, by the PQ droop networking control strategy, a circulating current caused by the great differences in voltage amplitude and phase can be quickly suppressed, current sharing control can be realized, and the completion of the networking can be ensued. In Condition 2, by the networking strategy in this embodiment, the networking time is the soft-start time of the first auxiliary converter, without requiring additional networking time.

Embodiment 4

Condition 3: In the emergency traction mode, the first auxiliary converter establishes the bus voltage, and then the non-first auxiliary converters are connected to the bus.

The occurrence of this condition may be caused by a premature generation of the intermediate voltage of the first traction converter. In this case, the networking control strategy in this embodiment and the general networking control strategy have the same networking time, which is the same as that described in Embodiment 1.

The above descriptions are only the preferred embodiments of the present application, and are not intended to limit the present application in other forms. A person skilled in the art may make changes or modifications to the mentioned-above technical contents to form equivalent embodiments that are then applied in other fields. However, any simple modifications, equivalent changes and modifications to the above embodiments in accordance with the technical essence of the present application, without departing from the technical solutions of the present application, shall be within the protection scope of the technical solutions of the present application.

The invention claimed is:

1. A synchronous soft-start networking control method for parallel auxiliary converters of Electric Multiple Units, comprising:
    by a fast networking logic, determining whether an auxiliary converter is a first auxiliary converter that is connected to a network during soft-start; if yes, executing a network connection logic for the first auxiliary converter, and if not, executing a network connection logic for a non-first auxiliary converter; and
    the non-first auxiliary converter quickly tracks amplitude, phase, and frequency of a bus voltage by a bus fast-tracking method to quickly complete networking;
    wherein the bus fast-tracking method comprises following specific steps:
    s1: recognizing the first auxiliary converter and the non-first auxiliary converter according to the fast networking logic, if it is the first auxiliary converter, executing step s2, otherwise, executing step s3;
    s2: closing an output contactor, performing a voltage closed-loop amplitude soft-start, and adjusting a voltage of the first auxiliary converter by a first set of PI parameters when the first auxiliary converter is connecting to the network; determining whether an output voltage is within a set specified range after the first auxiliary converter is connected to the network, and if yes, switching Proportion Integral Differential (PID) control method to adjust the voltage by a third set of PI parameters; and
    s3: the non-first auxiliary converter is quickly connected to the bus and quickly tracks the amplitude of the bus voltage, not performing amplitude soft-start, closed-loop controlling the PI parameters, and adjusting a voltage of the non-first auxiliary converter by a second set of PI parameters when the non-first auxiliary converter is connecting to the network; determining whether the amplitude, phase, and frequency of the bus voltage meet network connection requirements and whether an output voltage is within the set specified range, if yes, switching the Proportion Integral Differential (PID) control method to adjust the voltage by the third set of PI parameters after the non-first auxiliary converter is connected to the network.

2. The synchronous soft-start networking control method according to claim 1, wherein the fast networking logic comprises following specific steps:
    ss1: detecting whether the bus voltage exceeds a set voltage threshold of the first auxiliary converter before an auxiliary converter closes an output contactor; if not, recognizing the auxiliary converter as the first auxiliary converter and executing the network connection logic for the first auxiliary converter, that is, executing step ss2; if yes, recognizing the auxiliary converter as a non-first auxiliary converter and executing the network connection logic for non-first auxiliary converters, that is, executing step ss3;
    ss2: sending a command to close the output contactor until a close feedback of the output contactor is detected; determining whether the bus voltage is greater than the voltage threshold before the close feedback of the output contactor is received; if yes, switching to a startup of network connection of the non-first auxiliary converter and turning to step ss3; and if not, completing a startup of network connection of the first auxiliary converter;
    ss3: the non-first auxiliary converter tracks the bus voltage, determining whether deviations between an output voltage of the non-first auxiliary converter and the bus voltage in amplitude, frequency and phase are within set deviation ranges before the output contactor is closed; if yes, sending an output contactor close command to close the output contactor, and completing the startup of the network connection of the non-first auxiliary converter; and if not, executing step ss3 again.

3. The synchronous soft-start networking control method according to claim 2, wherein a method for setting the voltage threshold Ud of the first auxiliary converter is as follows:
    according to:

$$U_{alpha}=2/3*(Ua-Ub/2-Uc/2)$$

$$U_{beta}=2/3*(\sqrt{3}/2*Ub-\sqrt{3}/2*Uc)$$

$$Ud=\sqrt{U^2_{alpha}+U^2_{beta}}$$

combining above formulas to solve the voltage threshold Ud of the first auxiliary converter, where Ud is obtained by subjecting real-time phase voltage values Ua, Ub, Uc obtained by sampling to equal amplitude transformation to generate $U_{alpha}$ and $U_{beta}$ and then calculating Ud, and Ud is calculated in a single switching cycle.

4. The synchronous soft-start networking control method according to claim 3, wherein the voltage threshold Ud of the first auxiliary converter for AC380V bus is 50V.

5. The synchronous soft-start networking control method according to claim 1, wherein the bus fast-tracking method further comprises phase and frequency tracking, and using a software phase lock algorithm to quickly track the phase and frequency of the bus voltage.

6. The synchronous soft-start networking control method according to claim 1, further comprising an active power and reactive power droop networking control method: after auxiliary converters are connected to the network, parallel current sharing of the auxiliary converters during the soft-start process is quickly realized by the active power and reactive power droop networking control method.

7. The synchronous soft-start networking control method according to claim 6, wherein the active power and reactive power droop networking control method comprises:
introducing a correction coefficient K in droop coefficients, and calculating by following formula:

$$K = (V/V^*)^2$$
$$\begin{cases} f = f_0 - k_p * P * K \\ V = V_0 - k_Q * Q * K \end{cases}$$

where V is a given target value of a current amplitude closed-loop control, V* is a real-time output detection voltage value of a current auxiliary converter; f is a target frequency of the system, $f_0$ and $V_0$ are input control variables of the system, and P and Q are output active and reactive power components, $k_p$ and $k_Q$ are droop control coefficients and their values are related to specific mathematical models.

8. The synchronous soft-start networking control method according to claim 7, wherein a value of the correction coefficient K for the active power and reactive power droop networking control method is related to an output voltage amplitude, and a minimum value of V* is 1; when the amplitude reaches bus voltage requirement, that is, when entering Proportion Integral Differential, the value of K is set to 1.

9. A synchronous soft-start networking control method for parallel auxiliary converters of Electric Multiple Units, comprising:
by a fast networking logic, determining whether an auxiliary converter is a first auxiliary converter that is connected to a network during soft-start; if yes, executing a network connection logic for the first auxiliary converter, and if not, executing a network connection logic for a non-first auxiliary converter; and
the non-first auxiliary converter quickly tracks amplitude, phase, and frequency of a bus voltage by a bus fast-tracking method to quickly complete networking;
wherein the fast networking logic comprises following specific steps:
ss1: detecting whether the bus voltage exceeds a set voltage threshold of the first auxiliary converter before an auxiliary converter closes an output contactor; if not, recognizing the auxiliary converter as the first auxiliary converter and executing the network connection logic for the first auxiliary converter, that is, executing step ss2; if yes, recognizing the auxiliary converter as a non-first auxiliary converter and executing the network connection logic for non-first auxiliary converters, that is, executing step ss3;
ss2: sending a command to close the output contactor until a close feedback of the output contactor is detected; determining whether the bus voltage is greater than the voltage threshold before the close feedback of the output contactor is received; if yes, switching to a startup of network connection of the non-first auxiliary converter and turning to step ss3; and
if not, completing a startup of network connection of the first auxiliary converter;
ss3: the non-first auxiliary converter tracks the bus voltage, determining whether deviations between an output voltage of the non-first auxiliary converter and the bus voltage in amplitude, frequency and phase are within set deviation ranges before the output contactor is closed; if yes, sending an output contactor close command to close the output contactor, and completing the startup of the network connection of the non-first auxiliary converter; and if not, executing step ss3 again.

10. The synchronous soft-start networking control method according to claim 9, wherein a method for setting the voltage threshold Ud of the first auxiliary converter is as follows:
according to:

$$U_{alpha} = 2/3 * (Ua - Ub/2 - Uc/2)$$

$$U_{beta} = 2/3 * (\sqrt{3}/2 * Ub - \sqrt{3}/2 * Uc)$$

$$Ud = \sqrt{U^2_{alpha} + U^2_{beta}}$$

combining above formulas to solve the voltage threshold Ud of the first auxiliary converter, where Ud is obtained by subjecting real-time phase voltage values Ua, Ub, Uc obtained by sampling to equal amplitude transformation to generate $U_{alpha}$ and $U_{beta}$ and then calculating Ud, and Ud is calculated in a single switching cycle.

11. The synchronous soft-start networking control method according to claim 10, wherein the voltage threshold Ud of the first auxiliary converter for AC380V bus is 50V.

12. The synchronous soft-start networking control method according to claim 9, further comprising an active power and reactive power droop networking control method: after auxiliary converters are connected to the network, parallel current sharing of the auxiliary converters during the soft-start process is quickly realized by the active power and reactive power droop networking control method.

13. The synchronous soft-start networking control method according to claim 12, wherein the active power and reactive power droop networking control method comprises:
introducing a correction coefficient K in droop coefficients, and calculating by following formula:

$$K = (V/V^*)^2$$
$$\begin{cases} f = f_0 - k_p * P * K \\ V = V_0 - k_Q * Q * K \end{cases}$$

where V is a given target value of a current amplitude closed-loop control, V* is a real-time output detection voltage value of a current auxiliary converter; f is a target frequency of the system, $f_0$ and $V_0$ are input control variables of the system, and P and Q are output active and reactive power components, $k_p$ and $k_Q$ are droop control coefficients and their values are related to specific mathematical models.

14. The synchronous soft-start networking control method according to claim 13, wherein a value of the correction coefficient K for the active power and reactive power droop networking control method is related to an output voltage amplitude, and a minimum value of V* is 1; when the amplitude reaches bus voltage requirement, that is, when entering Proportion Integral Differential, the value of K is set to 1.

\* \* \* \* \*